United States Patent
Shiba et al.

(10) Patent No.: US 6,245,469 B1
(45) Date of Patent: Jun. 12, 2001

(54) MANUFACTURING METHOD FOR COLOR FILTER AND LIQUID CRYSTAL ELEMENT USING COLOR FILTER MANUFACTURED THEREBY

(75) Inventors: Shoji Shiba; Hiroshi Sato, both of Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/645,319

(22) Filed: Aug. 25, 2000

(30) Foreign Application Priority Data

Sep. 9, 1999 (JP) .................................. 11-255008
Dec. 27, 1999 (JP) .................................. 11-368678

(51) Int. Cl.⁷ ............................ G02B 5/20; G02F 1/1335
(52) U.S. Cl. ............................ 430/7; 347/107; 349/106; 349/156
(58) Field of Search ............................ 430/7; 347/106, 347/107; 349/106, 155, 156

(56) References Cited

U.S. PATENT DOCUMENTS

| | | | |
|---|---|---|---|
| 5,716,740 | 2/1998 | Shiba et al. | 430/7 |
| 6,094,247 | 7/2000 | Miyazaki et al. | 349/110 |
| 6,127,072 | 10/2000 | Shiba et al. | 430/7 |

FOREIGN PATENT DOCUMENTS

| | | |
|---|---|---|
| 59-75205 | 4/1984 | (JP) . |
| 61-173221 | 8/1986 | (JP) . |
| 63-235901 | 9/1988 | (JP) . |
| 63-237032 | 10/1988 | (JP) . |
| 1-217320 | 8/1989 | (JP) . |
| 2-223922 | 9/1990 | (JP) . |
| 3-94230 | 4/1991 | (JP) . |
| 3-184022 | 8/1991 | (JP) . |
| 4-122914 | 4/1992 | (JP) . |
| 9-105946 * | 4/1997 | (JP) . |
| 2872594 | 1/1999 | (JP) . |
| 2872595 | 1/1999 | (JP) . |
| 2872596 | 1/1999 | (JP) . |

* cited by examiner

*Primary Examiner*—John A. McPherson
(74) *Attorney, Agent, or Firm*—Fitzpatrick, Cella, Harper & Scinto

(57) ABSTRACT

A manufacturing method for a color filter provided with spacers on a base unit having at least a coloring layer including a plurality of coloring portions, according to the present invention, comprises at least a step of forming a photoresist layer on the base unit, a step of forming through-holes in the photoresist layer extending to the base unit, a step of injecting a curable resin composition into the throughholes using an inkjet method, a step of curing the curable resin composition so as to form the spacers, and a step of removing the photoresist layer. In addition, a liquid crystal element of the present invention has a liquid crystal contained between a pair of substrates, in which one of the substrates is composed of a color filter manufactured by a method for manufacturing a color filter of the present invention.

9 Claims, 7 Drawing Sheets

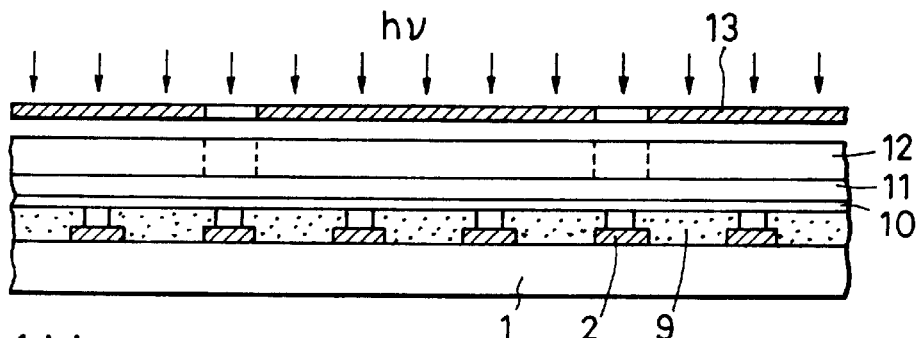
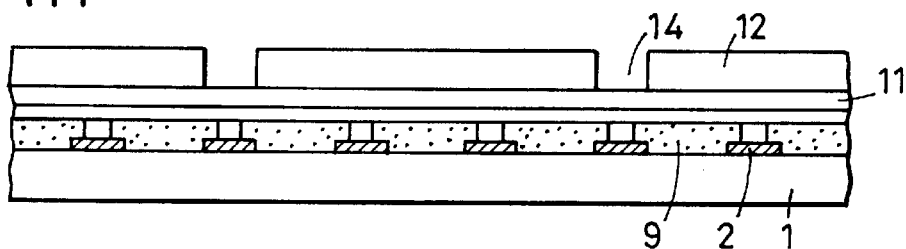
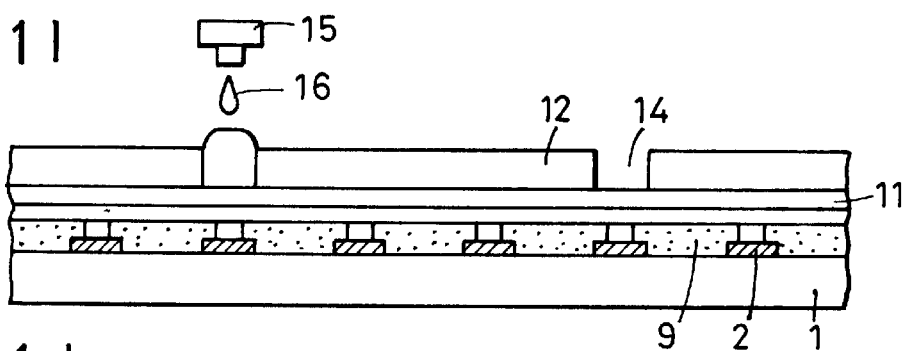
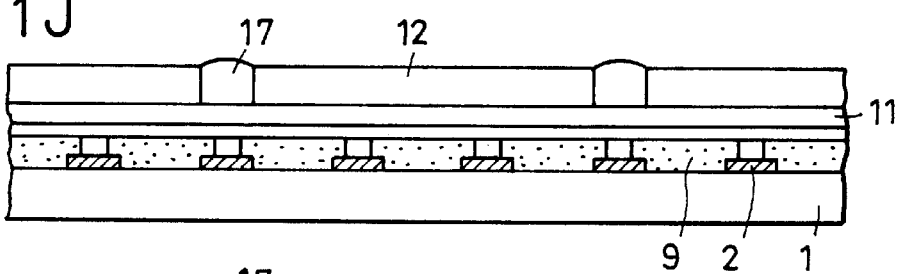
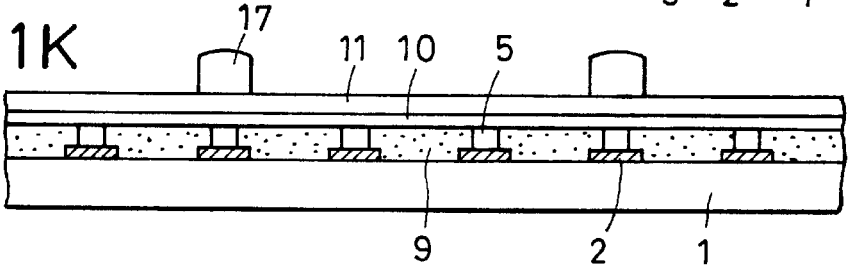

MANUFACTURING METHOD FOR COLOR FILTER AND LIQUID CRYSTAL ELEMENT USING COLOR FILTER MANUFACTURED THEREBY

BACKGROUND OF THE INVENTION

1. Field of the Invention

The present invention relates to methods for manufacturing color filters, which are components of color liquid crystal displays for use in color TVs, personal computers, and the like, and it relates to liquid crystal elements using the color filters manufactured thereby.

2. Description of the Related Art

Recently, concomitant with progress in personal computers, particularly, progress in portable personal computers, liquid crystal displays, in particular, color liquid crystal displays, are in increasing demand. However, it is inevitably necessary to reduce the cost thereof to further broaden applications thereof, and specifically, cost reduction of color filters, which are relatively expensive, has been desired.

Accordingly, in order to fulfill the desires described above, development of manufacturing methods for color filters exploiting inkjet printing techniques has been actively pursued (Japanese Patent Laid-Open Nos. 59-75205, 63-235901, and 1-217,320). The inventors of the present invention also proposed a method for forming coloring portions of red (R), green (G), and blue (B) using an inkjet printing technique in Japanese Patent Nos. 2,872,594, 2,872,595, 2,872,596, and the like.

Conventionally, a manufacturing method for a liquid crystal element comprises a step of providing liquid crystal driving units such as thin-film transistors (TFTS) and a coloring optical element such as a color filter on respective glass substrate, which are a pair of transparent insulating substrates, and a step of forming a transparent electrode and an alignment film on each substrate. Next, substantial spheres or cylindrical particles 3 to 10 $\mu$m in diameter composed of silica, alumina, a synthetic resin, or the like are dispersed as spacers on the entire surface of one glass substrate provided with the transparent electrode and the alignment film. The two glass substrates are adhered to each other so that each transparent electrode opposes the other with the spacers in a gap therebetween, and a liquid crystal is contained in the gaps between the glass substrates, whereby a liquid crystal element is formed.

However, since recent further miniaturization and finer processing of liquid crystal displays have been significant, in addition to the need for cost reduction thereof, improvement in display reliability has also been necessary more than ever. As one of the reasons for display defects in liquid crystal displays, non-uniformity of cell gaps (thickness of the liquid crystal layer) may be mentioned. Generally, in order to make cell gaps uniform, spacers are used which are uniformly dispersed between substrates containing a liquid crystal therebetween. However, when spacers are not uniformly dispersed, the thickness of a part of the liquid crystal layer varies, so that display defects may occur. In addition, when spacers partly agglomerate, light is scattered, so that display defects may also occur.

In general, beads of resin or silica, glass fibers, or the like are used as spacers, and they are uniformly dispersed on the substrate by the following methods. (1) A method in which spacers are uniformly dispersed in a low boiling point solvent, such as a flon or an alcohol, using ultrasonic waves or the like, and the solvent is then removed after atomizing the solution on the substrate. (2) A method in which spacers are dispersed on the substrate utilizing static electricity or an airstream.

However, when the methods described above are used, since spacers are randomly dispersed on the substrate, they are also disposed on pixels of R, G, and B, resulting in display defects. In particular, in the methods described above, agglomeration of spacers is not totally avoided, so that light is scattered by partial agglomerates of spacers, resulting in display defects.

In order to solve the problems described above, methods are proposed in Japanese Patent Laid-Open Nos. 61-173221, 2-223922, and the like, in which, after an alignment film is processed for rubbing, spacers composed of a polyimide or a resist are formed at places other than effective pixels by exposing a photosensitive polyimide or photoresist coated beforehand using a mask. According to the method described above, since spacers can be formed at desired places at desired density, non-uniformity of liquid crystal cell gaps can be improved when liquid crystal is contained therein. In addition, in Japanese Patent Laid-Open No. 3-94230, a method for fixing spacers in the form of beads on a shading layer in an area other than effective pixels is disclosed.

Furthermore, a method for using a thick black matrix as spacers disclosed in Japanese Patent Laid-Open Nos. 63-237032, 3-184022, 4-122914, and the like, a method for using an overlapped color resist as spacers disclosed in Japanese Patent Laid-Open No. 63-82405, and a method for forming a coloring pattern on a black matrix so as to be spacers disclosed in Japanese Patent Laid-Open No. 63-237032 have been proposed.

However, in order to form spacers having a uniform height on a large substrate, the thickness of a photosensitive resin composition to be coated on the substrate must be strictly controlled. In addition, when surface flatness of an underlying substrate is poor, there is a problem in that the thickness control mentioned above is difficult.

SUMMARY OF THE INVENTION

An object of the present invention is to provide a liquid crystal element having superior display quality at a reasonable cost, in which cell gaps are uniformly maintained and in which spacers have no adverse effects on display performance.

A manufacturing method for a color filter of the present invention is a method for manufacturing a color filter provided with spacers on a base unit having at least a coloring layer including a plurality of coloring portions on a substrate. The manufacturing method for a color filter provided with spacers comprises a step of forming a photoresist layer on the base unit, a step of forming throughholes in the photoresist layer extending to the base unit, a step of injecting a curable resin composition into the throughholes using an inkjet method, a step of curing the curable resin composition so as to form the spacers, and a step of removing the photoresist layer.

In addition, a liquid crystal element of the present invention comprises a pair of substrates, and a liquid crystal contained therebetween, in which one of the substrates is composed of a color filter manufactured by a manufacturing method for a color filter of the present invention.

Further objects, features, and advantages of the present invention will become apparent from the following description of the preferred embodiments with reference to the attached drawings.

BRIEF DESCRIPTION OF THE DRAWINGS

FIGS. 1A to 1K are cross-sectional views of a color filter provided with spacers showing manufacturing steps according to an embodiment of the present invention;

DESCRIPTION OF THE PREFERRED EMBODIMENTS

Figure 1A:
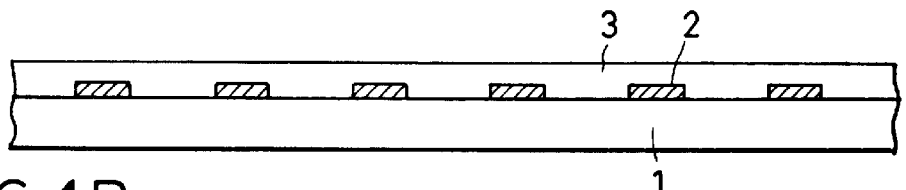
Figure 1B:
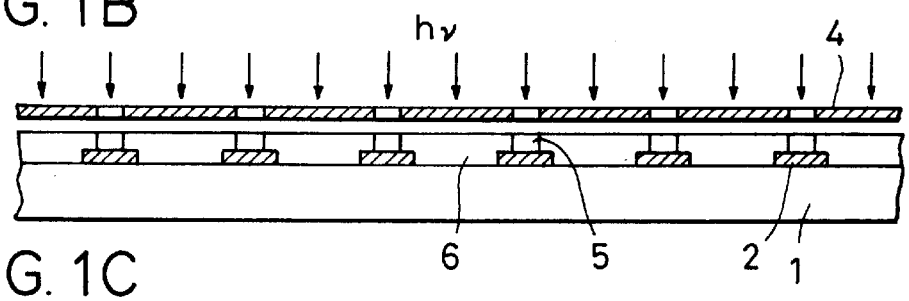
Figure 1C:
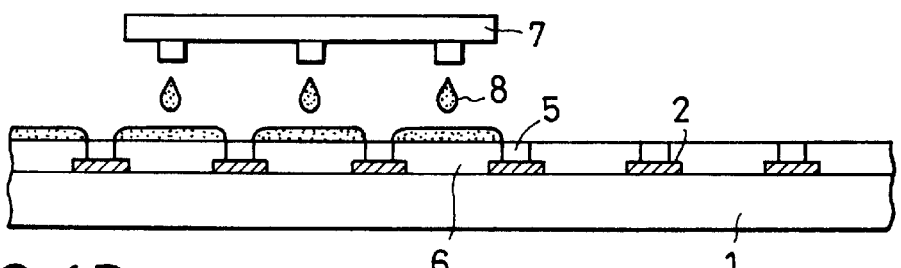
Figure 1D:
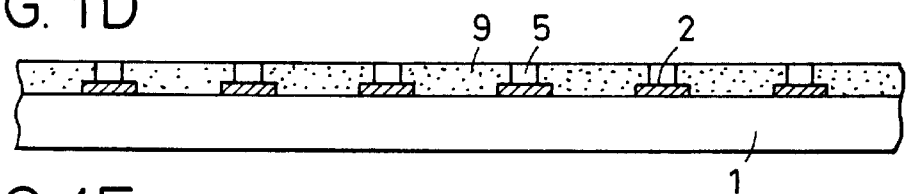
Figure 1E:
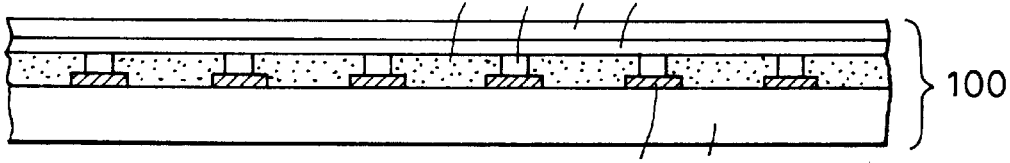
Figure 1F:
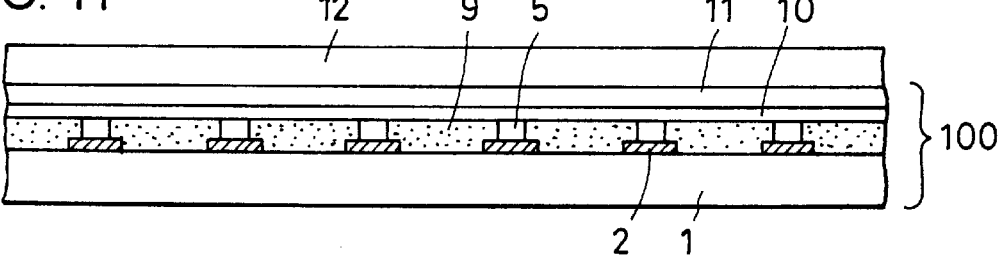

Hereinafter, the present invention will be described in detail with reference to the figures.

FIGS. 1A to 1K are cross-sectional views of a color filter provided with spacers showing steps in a manufacturing method therefor according to an embodiment of the present invention. In the figures, numeral 100 indicates a base unit, numeral 1 indicates a transparent substrate, numeral 2 indicates a black matrix, numeral 3 indicates a layer for receiving ink, numeral 4 indicates a photomask, numeral 5 indicates a non-color area which is not to be colored, numeral 6 indicates a color area which is to be colored, numeral 7 indicates an inkjet head, numeral 8 indicates a coloring ink, numeral 9 indicates a coloring portion, numeral 10 indicates a protective layer, numeral 11 indicates a transparent electrode, numeral 12 indicates a photoresist layer, numeral 13 indicates a photomask, numeral 14 indicates a thoughhole, numeral 15 indicates an inkjet head, numeral 16 indicates a curable resin composition, and numeral 17 indicates a spacer. FIGS. 1A to 1K are schematic cross-sectional views correspond to steps 1A to 1K described below, respectively.

Step 1A

The black matrix 2 as a shading layer having openings is formed, when necessary, on the transparent substrate 1, and the layer 3 for receiving ink composed of a resin composition is formed on the black matrix 2 and on the transparent substrate 1. In the present invention, as the transparent substrate 1, a glass substrate is generally used; however, the present invention is not limited thereto. A material may be used which has transparency, mechanical strength, and the like required for a liquid crystal element, and hence, a plastic substrate may be used instead. In addition, the shading layer in the present invention may be in the form of a black stripe.

The black matrix 2 is not specifically limited, and a known material may be used. For example, the black matrix 2 may be formed of a laminated film patterned by etching composed of a metal such as chromium (Cr) or a metal oxide formed on the transparent substrate 1 or may be formed by patterning a black resist coated on the transparent substrate 1. The thickness of the black matrix 2 is preferably 0.1 to 2.0 μm.

The layer 3 for receiving ink is a resin composition that is cured by light irradiation and/or heat treatment and has an ink absorbing property. More preferably, the layer 3 for receiving ink is composed of a photosensitive resin composition in which the ink absorbing property is increased or decreased by light irradiation, and non-color areas 5 which are not to be colored are formed by exposing between color areas 6 which are to be colored adjacent thereto so as to avoid color mixing. As a photosensitive resin composition mentioned above, acrylic resins, epoxy resins, amide resins, phenolic resins, polystyrene resins, or the like may be used together with, if necessary, a photosensitive initiator (a cross-linking agent). In the embodiment, a negative-type photosensitive resin composition in which the ink absorbing property is decreased by light irradiation is used.

The photosensitive resin composition described above is coated on the transparent substrate 1 using a known method, such as spin-coating, dipping, roll coating, bar coating, or slit coating and is then pre-baked, if necessary, so as to form the layer 3 for receiving ink.

In this connection, in addition to the ink absorbing property in which ink absorption is increased or decreased by light irradiation, the layer 3 for receiving ink preferably has a property in which the ink wettability is increased or decreased by light irradiation.

Step 1B

By performing exposure for patterning using the photomask 4, the color areas 6 which are to be colored having a ink absorbing property and the non-color areas 5 which are not to be colored having a lower ink absorbing property (or no ink absorbing property) than that of the color areas 6 are formed. In the embodiment, since the photosensitivity of the layer 3 for receiving ink is a negative-type, it is preferable to use a photomask having a pattern so as to form the width of the non-color area 5 to be less than that of the black matrix 2. Accordingly, decoloration in the opening in the black matrix 2 is avoided by forming the width of the coloring portion 9 to be greater than that of the black matrix 2.

On the other hand, when the photosensitivity of the layer 3 for receiving ink is a positive-type, by using the black matrix 2 as a photomask and by exposing from the backside of the transparent substrate 1, patterning by exposure can be performed without using a photomask.

Step 1C

Coloring inks 8, R (red), G (green), and B (blue), are provided to the color areas 6 which are to be colored in the layer 3 for receiving ink by the inkjet head 7 in accordance with a predetermined pattern. In the embodiment, since the non-color areas 5 having a low ink absorbing property (or no ink absorbing property) exist between the adjacent color areas 6, ink flowed out of the color area 6 which are to be colored is repelled at the non-color area 5 which are not to be colored, so that color mixing between the adjacent color areas 6 is avoided.

As the coloring ink 8 used in the present invention, a dye-type or a pigment-type coloring ink may be used, and in addition, a coloring ink, which can be ejected by an inkjet method, may be preferably used.

As an inkjet method used in the present invention, a bubble-jet method using an electrothermal converter as an energy generator, a piezo-jet method using a piezoelectric element, or the like may be used, and an area of coloration and a coloring pattern may be optionally determined.

Step 1D

After the coloring inks 8 are absorbed and sufficiently diffused in the color areas 6, drying is performed, if necessary, and a critical step for curing, such as light irradiation or heat treatment, is performed so as to cure the entire layer 3 for receiving ink and to form a coloring layer composed of the non-color areas 5 and the coloring portions 9.

Step 1E

After the protective layer 10 is formed, if necessary, the transparent electroconductive layer 11 (the transparent electrode 11) which is to be used as an electrode for driving a liquid crystal is formed. That is, in the embodiment, the base unit 100 comprises the black matrix 2, the coloring layer having the coloring portions 9 and the non-color areas 5, the protective layer 10, and the transparent electroconductive film 11, which are provided on the transparent substrate 1. As the protective layer 10, a photo-curable, thermo-curable, or thermo-and-photo-curable resin composition layer, or an inorganic layer formed by deposition, sputtering, or the like, may be used. In both cases, a layer may be used, which has transparency as a color filter and which can withstand subsequent steps for manufacturing a liquid crystal element, such as a step of forming the transparent electroconductive film, and a step of forming an alignment layer.

As the transparent electroconductive film 11, a film composed of indium-tin-oxide (ITO) is generally used and is formed by sputtering or the like.

Step 1F

The photoresist layer 12 is formed on the transparent electroconductive film 11. Screen printing, intaglio printing, intaglio-offset printing, slit coating, or the like may be used for forming the photoresist layer 12. commercially available materials may be suitably used for the photoresist layer 12; however, a material that is not dissolved in the curable ink 16 (the curable resin composition 16), which will be described later, must be used.

Step 1G

The photoresist layer 12 is exposed by using the photomask 13 so as to form a pattern. In the embodiment, a positive-type photoresist layer 12 is used, and hence, areas at which throughholes are formed are exposed.

The transparent electroconductive film 11 may require an additional pattern which is to be connected to leads for electrodes, and the photoresist layer 12 can also be used as a resist to form the additional pattern mentioned above. In this case, the photoresist layer 12 may be exposed in this Step 1G so as to form a mask that is used for patterning the transparent electroconductive film 11.

Step 1H

By performing a predetermined development or the like, the throughholes 14 extending to the transparent electroconductive film 11 are formed in the photoresist layer 12 in areas at which the black matrix 2 are formed thereunder.

Step 1I

The curable resin composition 16 is injected by the inkjet head 15 into the throughholes 14 formed in the photoresist layer 12. A material may be used as the curable resin composition 16 regardless of the presence of solvent, as long as it can be cured by light irradiation and/or heating, can be formed into the spacer 17 after curing, and can be ejected by a ink-jet method. As the curable resin composition 16, epoxy resins, acrylic resins, silicone resins, imide resins, or the like may be mentioned as examples.

An amount of the curable resin composition 16 injected into the throughhole 14 may be optionally determined so that a desired height of the resin composition 16 after curing is obtained. However, when the resin composition 16 is fluid in the uncured state, the amount thereof must be controlled so that the resin composition 16 does not flow over the surface of the photoresist layer 12 having the throughholes 14 therein. For example, when the fluidity of the curable resin composition 16 is low, and when the contacting angle thereof to the photoresist layer 12 is large, even if the resin composition 16 is in a form protruding from the surface of the photoresist layer 12 as shown in FIG. 1I, the resin composition would not flow over the surface of the photoresist 12. However, when the curable resin composition 16 contains a considerable volume of solvent and is very fluid, it is preferable to control the amount of the curable resin composition 16 so as not to form the shape thereof protruding out of the throughhole 14.

That is, in order to control the height of the spacer after curing, it is preferable to control the thickness of the photoresist layer 12 in which the throughholes are formed and to control the amount of the curable resin composition 16 injected into the throughhole 14. When both of these above factors are precisely controlled, uniform spacers 17 can be formed, in which variation of 1 $\mu$m or less in the height thereof can be obtained over the entire surface even in large substrates. Generally, in order to maintain a cell gap in the liquid crystal element, the height of the spacer 17 is set to be 2 to 10 $\mu$m.

As an inkjet method for injecting the curable resin composition 16 into the throughholes 14, similar to Step 1C for ejecting the coloring ink 8, a bubble-jet method using an electrothermal converter as an energy generator, a piezo-jet method using a piezoelectric element, or the like may be used.

Step 1J

The spacers 17 are formed by curing the curable thermosetting resin 16 using a predetermined treatment, such as light irradiation, heating, light irradiation together with heating, or the like. Light irradiation or heating is performed by a known method.

In the case in which the transparent electroconductive film 11 is patterned, prior to the injection of the curable resin composition 16 into the throughholes 14 in Step 1I described above or after the curing of the curable resin composition 16 in this Step 1J, the transparent electroconductive film 11 may be etched using the photoresist layer 12 as a mask.

Step 1K

The color filter provided with the spacers 17 of the present invention is obtained by removing the photoresist layer 12 using a solvent or the like. Alternatively, the curable resin composition 16 may be pre-cured in Step 1J, the photoresist layer 12 may be removed in this Step 1K, and the curable resin composition 16 thus pre-cured may be cured by a critical step, such as heating, so as to form the color filter provided with the spacers 17.

Figure 2A:
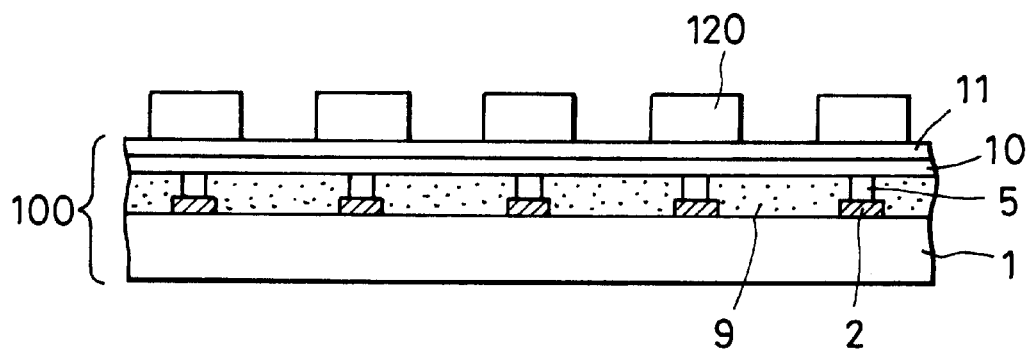
FIGS. 2A to 2C are cross-sectional views of a color filter provided with spacers showing manufacturing steps according to another embodiment of the present invention.
Figure 2B:
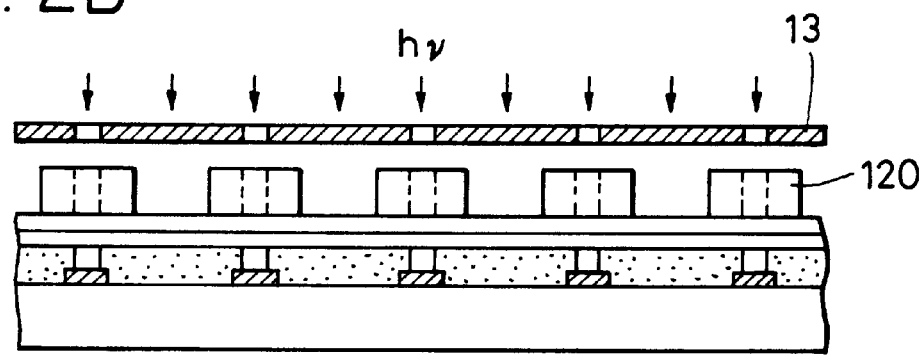
Figure 2C:
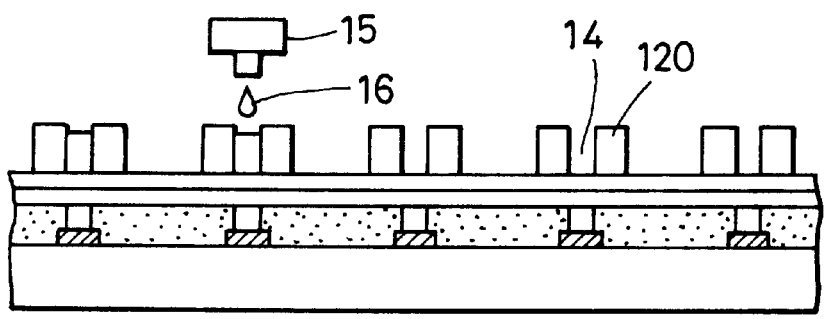

Photoresist may only be formed at which the spacers are to be formed as shown in FIGS. 2A to 2C, so that a resist material can be efficiently used. FIGS. 2A to 2C are schematic cross-sectional views corresponding to Steps 2A to 2C described below, respectively.

Step 2A

A positive-type photoresist pattern 120 is formed on a base unit 100.

Step 2B

The positive-type photoresist pattern 120 is exposed using a photomask 13, and the photoresist exposed is removed so that throughholes 14 extending to the base unit 100 are formed in the resist pattern 120.

Step 2C

A curable resin composition 16 is injected from an inkjet head 15 into the throughholes 14 formed in the resist pattern 120.

In the present invention, preferably, spacers 17 are selectively formed at areas at which a black matrix 2 is formed thereunder; however, the shapes and the numbers of the spacers 17 are not specifically limited. In addition, the cross-sectional area of the spacer 17 is preferably less than the area shaded by the black matrix 2.

Figure 3:
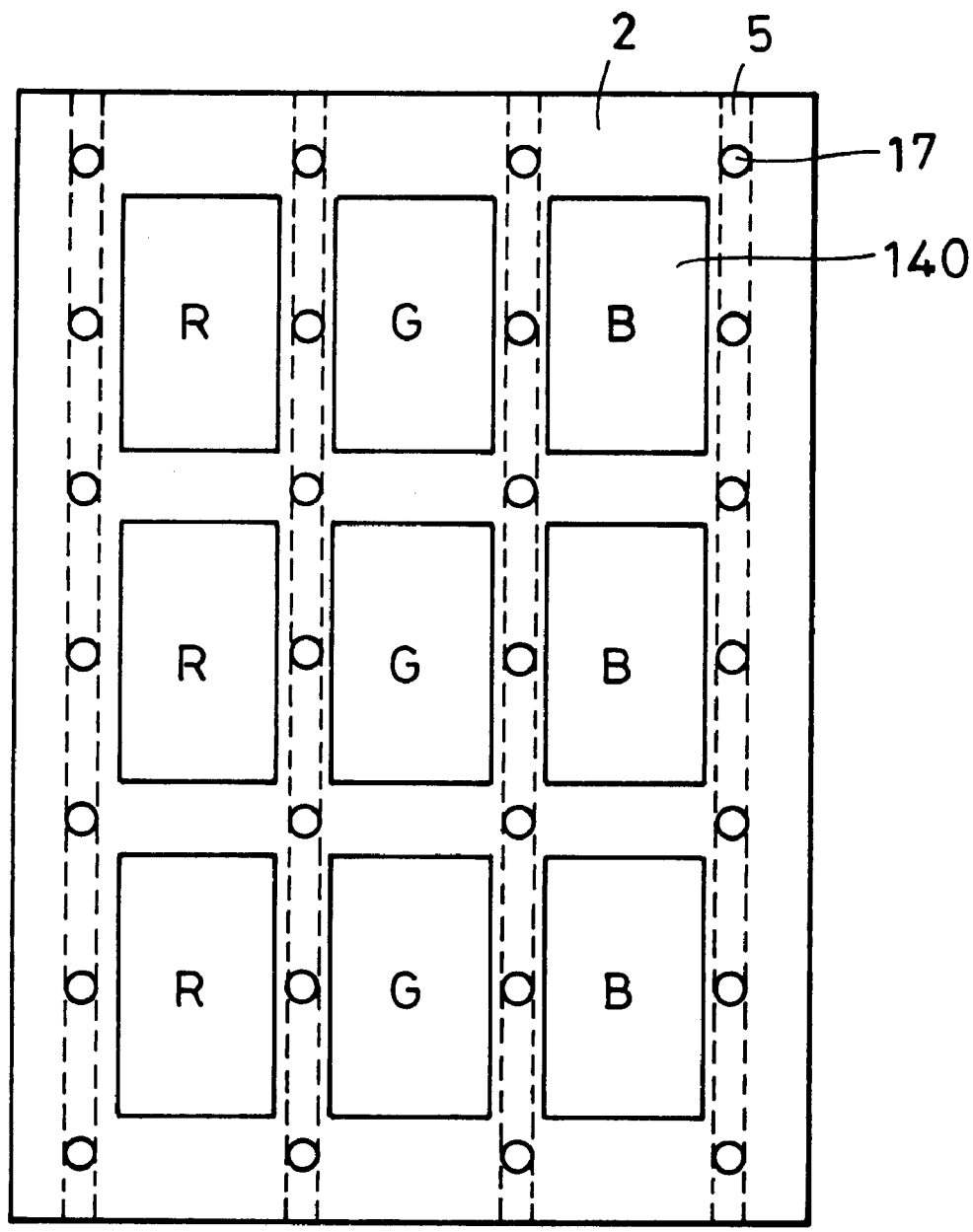
FIG. 3 is a schematic plan view of the color filter formed by the manufacturing steps in FIGS. 2A to 2C.
Figure 4A:
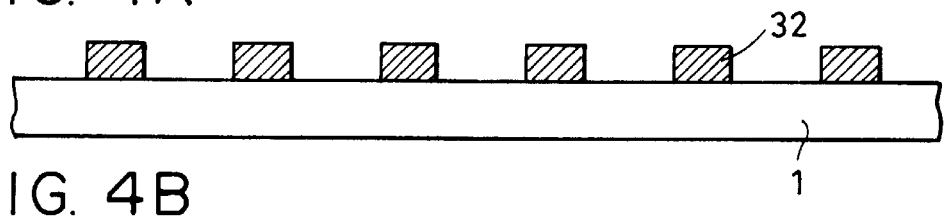
FIGS. 4A to 4J are cross-sectional views of a color filter provided with spacers showing manufacturing steps according to another embodiment of the present invention.
Figure 4B:
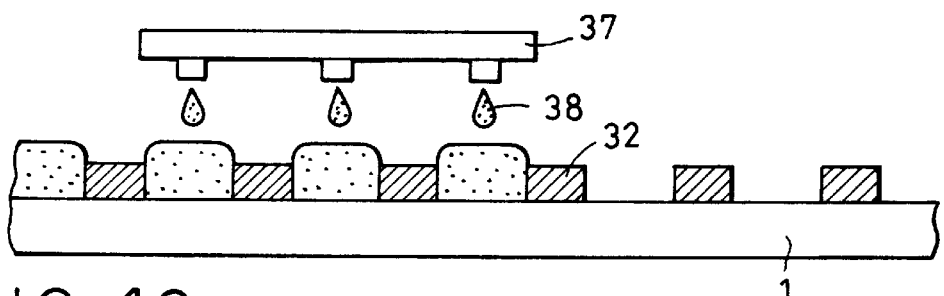
Figure 4C:
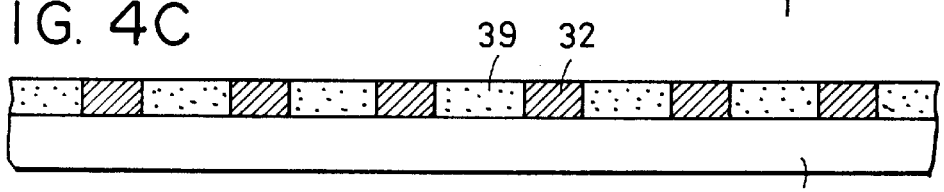
Figure 4D:
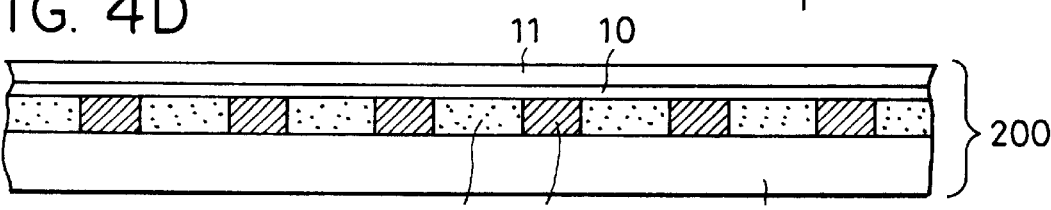
Figure 4E:
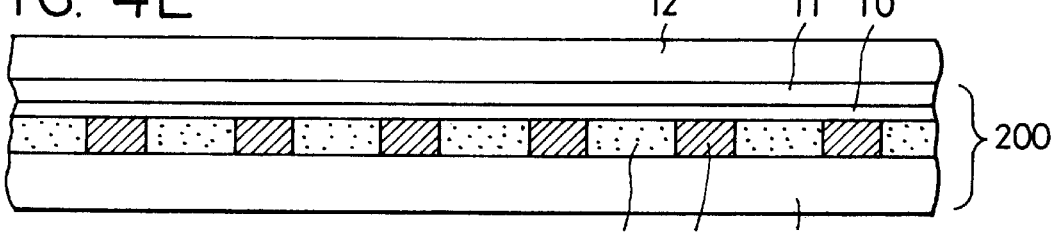
Figure 4F:
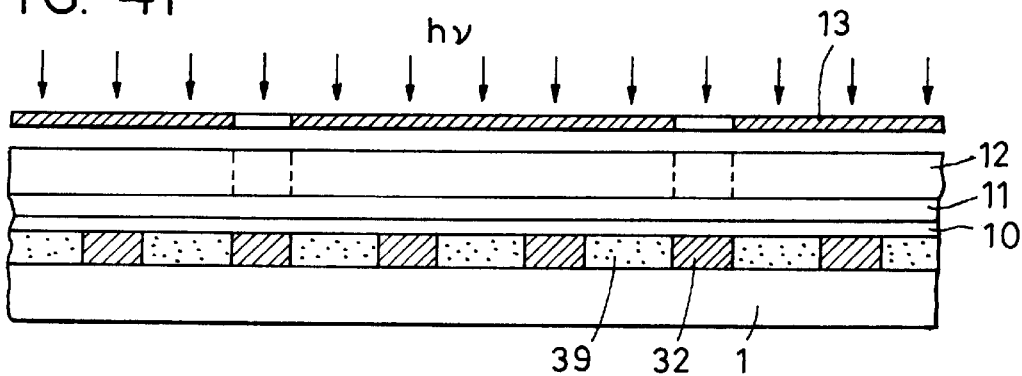
Figure 4G:
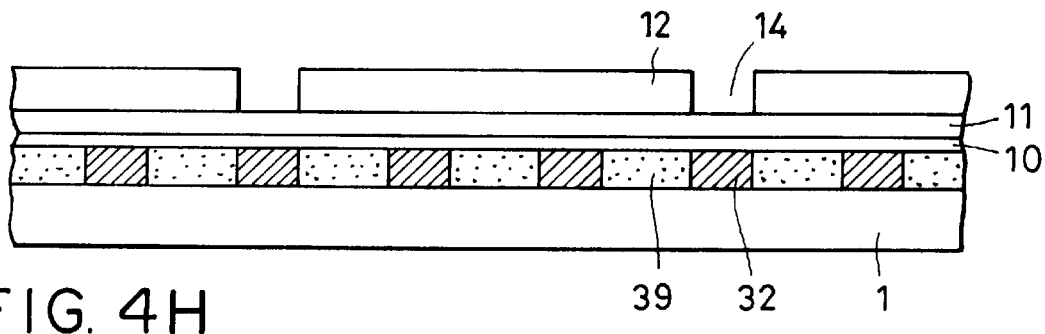
Figure 4H:
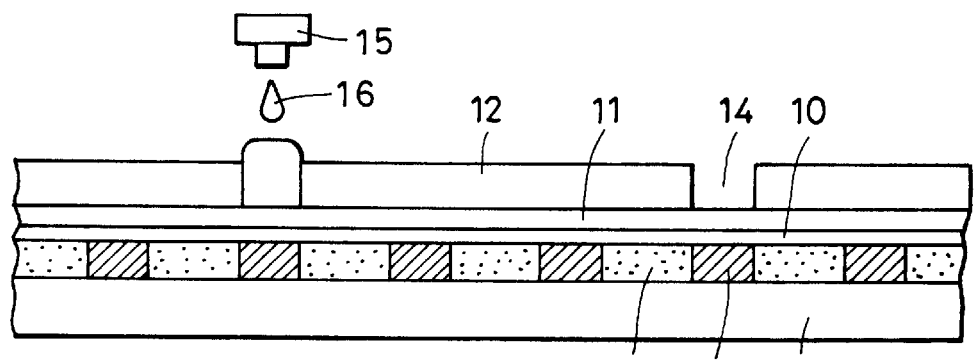
Figure 4I:
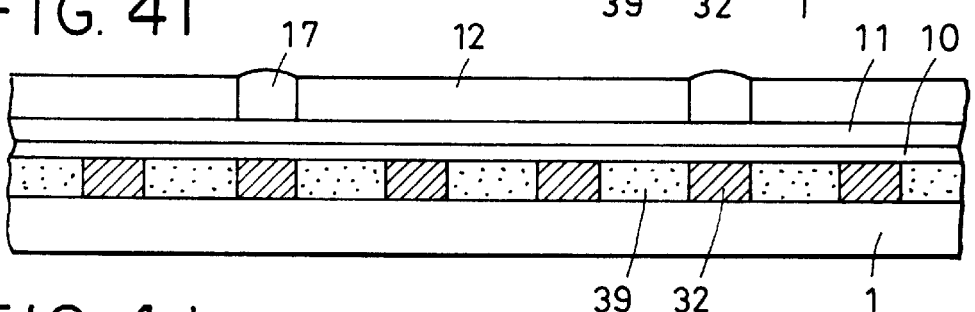
Figure 4J:
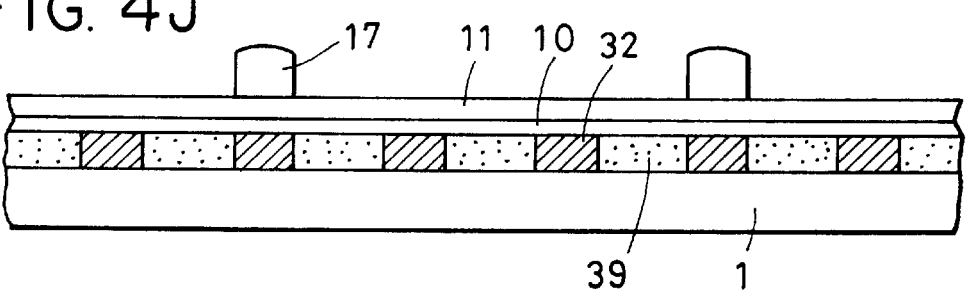

FIG. 3 is a schematic plan view of the color filter formed in the embodiment described above. In the figure, the same reference numerals assigned to the elements in FIG. 2 designate the same elements in FIG. 3. In addition, reference numeral 140 indicates a coloring pixel defined by the opening in the black matrix 2.

Next, manufacturing steps for a color filter provided with spacers according to another embodiment of the present invention are shown in FIGS. 4A to 4J. In the figure, the same reference numerals assigned to the elements in FIG. 1 designate the same elements in FIG. 4, and the descriptions thereof are omitted. In the figure, numeral 32 indicates a black matrix, numeral 37 indicates an inkjet head, numeral 38 indicates a curable coloring ink, and numeral 39 indicates a coloring portion. FIGS. 4A to 4J are schematic cross-sectional views showing manufacturing steps corresponding to Steps 4A to 4J described below, respectively.

Step 4A

The black matrix 32 having openings is formed of a black resin composition on a transparent substrate 1. The black matrix 32 has a barrier function to prevent color mixing of the curable coloring ink 38 which forms the coloring portions 39. As a black resin composition, a photosensitive resin composition is preferable. In particular, acrylic resins, epoxy resins, amide resins, phenolic resins, polystyrene resins, or the like, if necessary, together with a photosensitive initiator (a cross-linking agent) may be used mixed with a black dyestuff or a black pigment.

The photosensitive black resin composition described above is coated by using a known method, such as spin-coating, dipping, roll coating, bar coating, or slit coating, is then pre-baked, if necessary, and is exposed and developed, whereby the black matrix 32 having a predetermined pattern is obtained.

Step 4B

The curable coloring ink 38 is injected by the inkjet head 37 into the openings of the black matrix 32. As the curable coloring ink 38, a resin cured by application of energy, such as light irradiation or heating, and a color resin composition containing dyestuffs or pigments for the colors R, G, and B, are used. As a resin mentioned above, melamine resins, a melamine compound and a polymer having hydroxyl or carboxyl groups, a polyfunctional epoxy compound and a polymer having hydroxyl or carboxyl groups, a fibrinous reactive compound and a polymer having hydroxyl or carboxyl groups, an epoxy resin and a resol resin, an epoxy resin and an amine compound, an epoxy resin and a carboxylic acid or an acid anhydride, an epoxy compound, or a negative-type resist may be mentioned as examples.

As an inkjet method, similar to Step 1C for ejecting the coloring ink of the first embodiment described above, a bubble-jet method using an electrothermal converter as an energy generator, a piezo-jet method using a piezoelectric element, or the like may be used. In addition, a coloring pattern may be optionally determined.

Step 4C

After drying is performed if necessary, the curable coloring ink 38 is cured by performing a critical treatment, such as light irradiation or heating, so that the coloring portions 39 are formed. In the embodiment, the coloring portions 39 correspond to the coloring layer of the color filter.

Steps 4D to 4J

Steps 4D to 4J are performed in a manner similar to those shown in FIGS. 1E to 1K. That is, after a protective layer 10 is, if necessary, formed on the coloring layer, a transparent electroconductive layer 11 is formed, so that a base unit 200 is formed. After a photoresist layer 12 is formed on the base unit 200, and throughholes 14 are formed in the photoresist layer 12 by exposing, a curable resin composition 16 is injected into the throughholes 14 using an inkjet head 15 so as to form spacers 17. Subsequently, the spacers 17 are cured, and the photoresist layer 12 is removed, so that the color filter provided with spacers of the present invention is obtained.

In FIGS. 1A to 1K and 4A to 4J, steps for forming the coloring layer of the color filter by an inkjet method are described; however, the present invention is not limited thereto and is preferably applied to a color filter in which the coloring layer is formed by a conventional pigment dispersing method or the like. According to the manufacturing method using an inkjet method, a smoother and flatter coloring layer can be obtained than that formed by using a pigment dispersing method, so that the present invention can be further effectively practiced.

Figure 5:
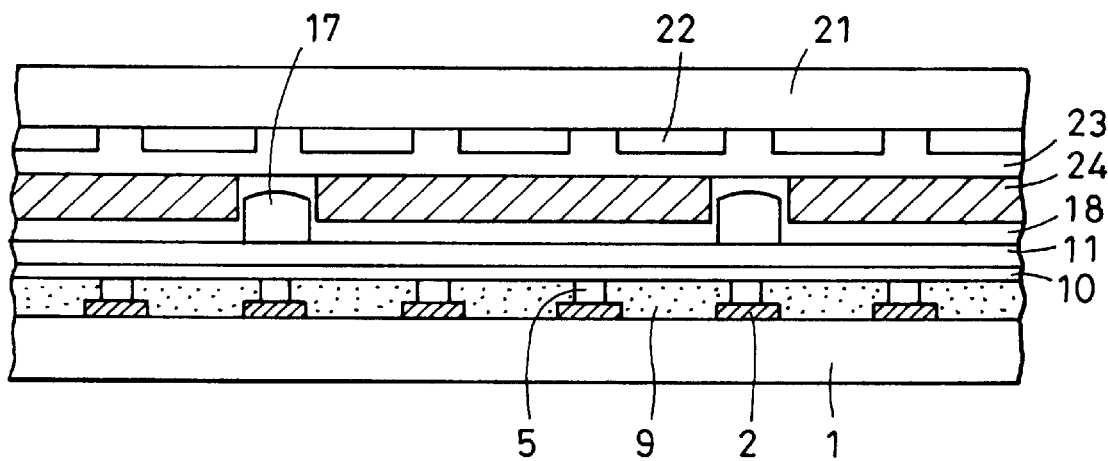
FIG. 5 is a schematic cross-sectional view of a liquid crystal element formed of a color filter provided with spacers manufactured in accordance with steps shown in FIGS. 1A to 1K according to the embodiment of the present invention.

Next, an example of a liquid crystal element of the present invention is shown in FIG. 5. FIG. 5 is a schematic cross-sectional view of an example of a liquid crystal element having the color filter provided with spacers of the present invention shown in FIG. 1K. In the figure, numeral 21 indicates a counter substrate, numeral 22 indicates a pixel electrode, numerals 18 and 23 indicate alignment films, and numeral 24 indicates a liquid crystal. The liquid crystal element shown in the figure is an example of an active matrix type (a so-called "TFT type") liquid crystal element having a thin film transistor (a TFT) in each pixel.

The liquid crystal element is generally formed by encapsulating the liquid crystal 24 between the substrate 1 at the color filter side and the counter substrate 21 opposing each other. The TFTs (not shown) and the transparent pixel electrodes 22 are disposed in the form of a matrix inside the counter substrate 21. In addition, inside the transparent substrate 1, the coloring portions 9 are formed so that R, G, and B oppose the pixel electrodes 22, and the transparent electroconductive film 11 (a common electrode) is formed on the entire surface above the coloring portions 9. Furthermore, the alignment films 18 and 23 are formed inside both substrates, and liquid crystal molecules can be aligned in one direction by rubbing the alignment films 18 and 23. The distance between the substrates is maintained constant by the spacers 17, the substrates are adhered to each other by a sealing material (not shown), and the liquid crystal 24 is contained in the gap therebetween. As a liquid crystal, a common liquid crystal, such as a TN-type liquid crystal, a ferroelectric liquid crystal, or the like, may be used.

When the liquid crystal element described above is of the transmissive type, polarizers are provided outside both substrates and a backlight unit composed of, in general, a fluorescent lamp and a diffusing plate, and when the liquid crystal element described above is of the reflective type, a polarizer is provided outside the transparent substrate 1, whereby display can be performed by employing the liquid crystal 24 as an optical shutter in both cases for changing optical transmittance.

In the embodiment described above, the TFT type liquid crystal element is described; however, the present invention is preferably applied to other driving type liquid crystal elements such as a passive matrix display. In addition, the liquid crystal element of the present invention may be preferably used for a direct viewing display or a projection display.

EXAMPLE 1

On a glass substrate provided with a black matrix composed of multi-layer chromium in the form of stripes having two different widths of 25 μm and 50 μm and having openings 75 μm in width and 250 μm in length, a resin composition dissolved in ethyl cellusolve composed of 97 percent by weight of an acrylic copolymer having the composition shown below and 3 percent by weight of triphenyl sulfonium triflate was spin-coated so as to form a film 2 μm thick and was then pre-baked at 90° C. for 20 minutes, whereby a layer for receiving ink was formed.

Composition of the Acrylic Copolymer

| | |
|---|---|
| Methyl methacrylate | 50 parts by weight |
| 2-Hydroxyethyl methacrylate | 30 parts by weight |
| N-methylol acrylamide | 20 parts by weight |

A part of the layer for receiving ink on the black matrix was patterned in the form of stripes having openings less than those of the black matrix by exposing using a photomask and was then heated at 120° C. for 1 minute on a hot plate. Next, unexposed areas were colored in the form of a striped pattern with continuous dots by dye inks of R (red), G (green), and B (blue) using an inkjet printing apparatus and was then dried at 90° C. for 5 minutes. Subsequently, the entire layer for receiving ink was heated to 200° C. for 60 minutes so as to be cured, whereby a coloring layer was obtained.

On the coloring layer thus obtained, a two-component thermosetting resin composition (JSR Corporation, SS6699G) was spin-coated so as to be 1 μm thick, and was then pre-baked at 90° C. for 30 minutes. Subsequently, heating at 250° C. for 60 minutes was performed, so that a protective layer was formed. An ITO film was formed on the protective layer by sputtering so as to be a film 1,500 Å thick, whereby a base unit, which was used as the color filter, was obtained.

On the color filter formed by the steps thus described, a positive-type photoresist (Tokyo Ohka Kogyo Co., Ltd., PMER resist) was coated so as to be 2 μm thick, and a predetermined exposure and development was performed, whereby a pattern for etching the ITO film and a throughhole pattern for forming spacers were formed above the black matrix 50 μm wide. Next, a predetermined amount of a thermosetting resin composition composed of an epoxy resin and an acid anhydride was injected into each throughhole and was then pre-cured at 120° C. for 20 minutes by heating.

The ITO film was etched by using an etchant for ITO (Kanto Kagaku, ITO-02), and the photoresist was removed by dissolution thereof using acetone. In addition, the thermosetting resin composition was completely cured at 200° C. for 30 minutes, so that the spacers were formed. The heights from the ITO film of the hundred spacers thus formed were measured. The results were that the spacers were cylindrical shape 20 μm in diameter, the average height thereof was 4.0 μm, and the variation in the height was 1.0 μm or less.

EXAMPLE 2

Spacers were formed in a manner similar to EXAMPLE 1 except that an ITO film was etched prior to an injection of the thermosetting resin composition into throughholes.

The heights from the ITO film of the hundred spacers thus formed were measured. The results were that the spacers were cylindrical shape 20 μm in diameter, the average height thereof was 3.85 μm, and the variation in the height was 1.0 μm or less.

EXAMPLE 3

On the color filter in EXAMPLE 1 prior to the formation of the spacers, the positive-type photoresist used in EXAMPLE 1 was coated so as to be 4 μm thick, and a predetermined exposure and development was performed, whereby a pattern for etching the ITO film and a throughhole pattern for forming spacers were formed. Next, a predetermined amount of a polyimide as a curable resin composition was injected into each throughhole and was then pre-cured at 150° C. for 20 minutes by heating.

Subsequently, after the ITO film was etched by using an etching solution for ITO, the photoresist was removed by using a stripping solution. In addition, the polyimide was completely cured at 250° C. for 60 minutes, so that the spacers were formed. The heights from the ITO film of the hundred spacers thus formed were measured. The results were that the spacers were cylindrical shape 20 μm in diameter, the average height thereof was 4.0 μm, and the variation in the height was 1.0 μm or less.

EXAMPLE 4

Spacers were formed in a manner similar to EXAMPLE 3 except that the ITO film was etched prior to an injection of the polyimide into the throughholes.

The heights from the ITO film of the hundred spacers thus formed were measured. The results were that the spacers were cylindrical shape 20 μm in diameter, the average height thereof was 3.85 μm, and the variation in the height was 1.0 μmor less.

EXAMPLE 5

On the color filter prior to the formation of the spacer in EXAMPLE 1, the positive-type photoresist used in EXAMPLE 1 was coated so as to be 4 μm and was processed by a predetermined exposure and development, so that a pattern for etching the ITO film and a throughhole pattern for forming spacers were formed.

After the ITO film was etched by using an etchant for ITO, a predetermined amount of an acrylic photo-curable resin as a curable resin composition was injected into each throughhole by using an inkjet printing apparatus. Subsequently, the acrylic photo-curable resin was pre-baked by heating at 90° C. for 20 minutes and was then photo-cured by exposing the entire surface. In addition, the photoresist was removed using a developing solution, and heat treatment was performed at 250° C. for 60 minuets for curing, whereby the spacers were formed. The heights from the ITO film of the hundred spacers thus formed were measured. The results were that the spacers were cylindrical shape 20 μm in diameter, the average height thereof was 4.0 μm, and the variation in the height was 1.0 μm or less.

EXAMPLE 6

A plurality of positive-type photoresist films in the form of rectangles 100 μm width and 100 μm length was formed so as to be 5 μm thick at regular intervals by screen-printing at places corresponding to a black matrix in a base unit similar to that in EXAMPLE 1. Each photoresist film was processed by a predetermined exposure and development, so that throughholes 20 μm in diameter were formed. Next, a thermosetting resin composition composed of an epoxy compound and an acid anhydride was injected into each throughhole by an inkjet printing apparatus in a predetermined amount of the resin composition less than the volume of the throughhole, and a heat treatment was performed at 120° C. for 20 minutes so that the resin composition was pre-baked.

Next, after the resist pattern was removed by dissolution thereof using acetone, the thermosetting resin composition was completely cured by heating at 200° C. for 30 minutes, so that the spacers were formed. The heights from an ITO film of the hundred spacers thus formed were measured. The results were that the average height thereof was 3.0 μm, and the variation in the height was 0.2 μm or less.

EXAMPLE 7

A color filter provided with spacers was formed in a manner similar to EXAMPLE 6 except that a base unit provided with no ITO film was used. The heights of the hundred spacers thus formed were measured. The results were that the average height thereof was 3.0 μm, and the variation in the height was 0.2 μm or less.

EXAMPLE 8

A color filter provided with spacers was formed in a manner similar to EXAMPLE 6 except that the base unit provided with no ITO film and no protective layer was used. The heights of the hundred spacers thus formed were measured. The results were that the average height thereof was 3.0 μm, and the variation in the height was 0.2 μm or less.

EXAMPLE 9

A plurality of positive-type photoresist films in the form of rectangles 150 μm in width and 150 μm in length was formed at regular intervals so as to be 7 μm thick at regular intervals by intaglio printing at places corresponding to the black matrix in the same base unit as was used in EXAMPLE 1. Each photoresist film was processed by a predetermined exposure and development, so that throughholes 20 μm in diameter were formed. Next, a polyimide resin was injected into each throughhole by an inkjet printing apparatus in a predetermined amount of the resin less than the volume of the throughhole, and a heat treatment was performed at 150° C. for 20 minutes so that the polyimide resin was pre-baked.

Next, the resist pattern was removed using a stripping solution. The polyimide resin was completely cured by heating at 250° C. for 60 minutes, and the spacers were thus formed. The heights from the ITO film of the hundred spacers thus formed were measured. The results were that the average height thereof was 3.2 μm, and the variation in the height was 0.2 μm or less.

EXAMPLE 10

Positive-type photoresist films 150 μm in diameter were formed at regular intervals so as to be 6 μm thick by intaglio-offset printing at places corresponding to the black matrix in the same base unit as was used in EXAMPLE 1. Each photoresist film was processed by a predetermined exposure and development, so that throughholes 20 μm in diameter were formed. Next, an acrylic photo-curable resin was injected into each throughhole by an inkjet printing apparatus in a predetermined amount less than the volume of the throughhole, and a heat treatment was performed at 90° C. for 20 minutes so that the photo-curable resin was pre-baked. Subsequently, the photo-curable resin was photo-cured by exposing the entire surface.

After the resist pattern described above was removed using a developing solution, the photo-curable resin was cured by heating at 250° C. for 60 minutes, and spacers were thus formed. The heights from the ITO film of the hundred spacers thus formed were measured. The results were that the average height thereof was 3.5 μm, and the variation in the height was 0.2 μm or less.

As has thus been described, according to the present invention, spacers having uniform heights can be easily formed selectively in areas at which display is not adversely influenced by a smaller number of manufacturing steps, and more particularly, the spacers can be formed by a smaller number of manufacturing steps by using a photoresist for etching an ITO film as a pattern for forming spacers. Consequently, according to the present invention, a highly reliable liquid crystal element, in which the cell gaps are uniformly maintained, can be provided with good yield and at a reasonable cost.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A manufacturing method for a color filter provided with spacers on a base unit having at least a coloring layer including a plurality of coloring portions on a substrate, comprising:

a step of forming a photoresist layer on the base unit;

a step of forming throughholes in the photoresist layer extending to the base unit;

a step of injecting a curable resin composition into the throughholes using an inkjet method;

a step of curing the curable resin composition so as to form the spacers; and a step of removing the photoresist layer.

2. A manufacturing method for a color filter provided with spacers, according to claim 1, further comprising a step of forming a shading layer having a plurality of openings on the substrate, and a step of forming the coloring portions in the openings.

3. A manufacturing method for a color filter provided with spacers, according to claim 2, wherein the throughholes are formed in an area at which the shading layer is formed thereunder.

4. A manufacturing method for a color filter provided with spacers, according to claim 2, further comprising a step of forming a protective layer on the coloring layer, and a step of forming a transparent electroconductive film on the protective layer.

5. A manufacturing method for a color filter provided with spacers, according to claim 4, further comprising a step of patterning the photoresist layer so as to be a mask for patterning the transparent electroconductive film, and a step of etching the transparent electroconductive film using the photoresist layer as the mask before or after an injection of the curable resin composition into the throughholes.

6. A manufacturing method for a color filter provided with spacers, according to claim 1, wherein the photoresist layer is formed at a place at which the spacer is to be formed.

7. A manufacturing method for a color filter provided with spacers, according to claim 1, further comprising a step of forming a layer for receiving ink composed of a resin composition on the substrate, and a step of coloring the layer for receiving ink by providing a coloring ink therein using an inkjet method, whereby the coloring portions are formed.

8. A manufacturing method for a color filter provided with spacers, according to claim 1, further comprising a step of forming a shading layer having openings therein composed of a black resin composition, and a step of curing a curable coloring ink composed of a color resin composition injected into the openings in the shading layer, whereby the coloring portions are formed.

9. A liquid crystal element comprising:

a pair of substrates; and a liquid crystal contained between the pair of substrates;

wherein one of the pair of substrates is composed of a color filter manufactured by a method for manufacturing a color filter according to claim 1.

* * * * *

UNITED STATES PATENT AND TRADEMARK OFFICE
CERTIFICATE OF CORRECTION

PATENT NO.    : 6,245,469 B1
DATED         : June 12, 2001
INVENTOR(S)   : Shiba et al.

It is certified that error appears in the above-identified patent and that said Letters Patent is hereby corrected as shown below:

Title page,
Item [56] References Cited:
FPD, "2872594" should read -- 11-72594 --;
"2872595" should read -- 11-72595 --; and
"2872596" should read -- 11-72596 --.

Column 1,
Line 27, "1-217,320)." should read -- 1-217320). --.

Column 3,
Line 42, "correspond" should read -- corresponding --.

Column 10,
Line 29, "μmor" should read -- μm or --; and
Line 46, "minuets should read -- minutes --.

Column 14,
Line 3, "substrates;" should read -- substrates, --.

Signed and Sealed this

Twenty-eighth Day of May, 2002

Attest:

JAMES E. ROGAN
Attesting Officer        Director of the United States Patent and Trademark Office